(12) United States Patent
Rebuffel et al.

(10) Patent No.: US 11,428,649 B2
(45) Date of Patent: Aug. 30, 2022

(54) METHOD FOR ESTABLISHING A SPECTRAL RESPONSE FUNCTION OF A SYSTEM FOR MEASURING WITH X-RAYS OR GAMMA RAYS

(71) Applicant: Commissariat à l'Energie Atomique et aux Energies Alternatives, Paris (FR)

(72) Inventors: Véronique Rebuffel, Grenoble (FR); Clarisse Fournier, Grenoble (FR); Pierre-Antoine Rodesch, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 57 days.

(21) Appl. No.: 17/150,060

(22) Filed: Jan. 15, 2021

(65) Prior Publication Data
US 2021/0223189 A1 Jul. 22, 2021

(30) Foreign Application Priority Data
Jan. 16, 2020 (FR) ...................................... 20 00422

(51) Int. Cl.
*G01N 23/10* (2018.01)
*G01T 1/24* (2006.01)

(52) U.S. Cl.
CPC ............... *G01N 23/10* (2013.01); *G01T 1/24* (2013.01); *G01N 2223/303* (2013.01)

(58) Field of Classification Search
None
See application file for complete search history.

(56) References Cited

U.S. PATENT DOCUMENTS 10,067,240 B1 * 9/2018 Svensson .................. G01T 1/18
2006/0159223 A1 * 7/2006 Wu ........................ A61B 6/482
378/18

(Continued)

OTHER PUBLICATIONS

French Preliminary Search Report dated Oct. 19, 2020 in French Application 20 00422 filed Jan. 16, 2020 (with English Translation of Categories of Cited Documents and Written Opinion), 9 pages.

(Continued)

*Primary Examiner* — Hoon K Song
(74) *Attorney, Agent, or Firm* — Oblon, McClelland, Maier & Neustadt, L.L.P.

(57) ABSTRACT

A method for determining a response of a spectrometric system for measuring ionizing x-ray or gamma-ray photons, the measuring system comprising:
  a radiation source, configured to emit ionizing radiation along an emission axis;
  a pixelated detector, which comprises pixels, each pixel being configured to detect radiation emitted by the radiation source, and to acquire thereof an energy spectrum, in a plurality of energy channels;
  the emission axis being an axis extending between the radiation source and the detector;
the response of the measuring system taking the form of effective spectra, defined for each pixel, and in each energy band, the effective spectrum of a pixel, in an energy band, corresponding to an energy distribution of the photons detected, by the pixel, in the energy channel, in the absence of any object interposed between the source and the pixel.

10 Claims, 9 Drawing Sheets

(56) References Cited

U.S. PATENT DOCUMENTS

2016/0203620 A1* 7/2016 Zou ................. A61B 6/4241
378/19
2017/0309043 A1* 10/2017 Li ..................... G06T 7/0002
2020/0187893 A1* 6/2020 Yaroshenko ........ A61B 6/482

OTHER PUBLICATIONS

Liu, X. et al., "Spectral response model for a multibin photon-counting spectral computed tomography detector and its applications," Journal of Medical Imaging, vol. 2, No. 3, Jul.-Sep. 2015, Sep. 11, 2015, XP060072428, 12 pages.

Rodesch, P-A. et al., "Spectral CT reconstruction with an explicit photon-counting detector model: a "one-step" approach," Progress in Biomedical Optics and Imaging, SPIE, vol. 10573, Mar. 9, 2018, XP060105018, 8 pages.

* cited by examiner

METHOD FOR ESTABLISHING A SPECTRAL RESPONSE FUNCTION OF A SYSTEM FOR MEASURING WITH X-RAYS OR GAMMA RAYS

TECHNICAL FIELD

The technical field of the invention is the spectrometric detection of ionizing radiation, with a pixelated imager.

PRIOR ART

The inspection of objects with X-rays, in the medical or industrial field, is very widespread. Existing methods consist in placing an object between a source of radiation and a detector, then in irradiating the object using the source. The detector then forms an image, generally in two dimensions, of the radiation transmitted by the object. This image is representative of the attenuation, by the object, of the radiation emitted by the source.

Such an image may be used for the purposes of medical diagnosis, nondestructive testing in the industrial field, or even in the detection of suspect materials, for example in baggage screening.

Recently, the emergence of spectrally resolved detectors has allowed the performance of such analyses to be substantially improved. Such detectors allow a spectrum of radiation transmitted by an irradiated material to be acquired. The spectrum comprises a plurality of channels, each channel being representative of one energy band. Such a spectrum may generally comprise tens or even hundreds of channels. Generally, a plurality of spectra of the same object are acquired, so as to reconstruct the object, i.e. obtain a spatial distribution of characteristics of the object. It may be a question of an estimation of the spatial distribution of the density and/or of the atomic number of the object, or of an estimation of the nature of materials present in the object. One common application is the performance of tomographic reconstruction, on the basis of spectra taken around an object to be reconstructed.

The interpretation of spectrometric measurements assumes knowledge of the response of the measuring system used. The measuring system notably comprises the radiation source and the detector, the latter usually taking the form of a linear or matrix array of pixels. Each pixel then forms one elementary spectrometric detector. As precise as possible knowledge of the response of the system is important, so as to increase the performance of the analyses and facilitate interpretation.

The inventors propose a method allowing a response of the system to be obtained more precisely than in the prior art.

SUMMARY OF THE INVENTION

A first subject of the invention is a method for determining a spectral response of a spectrometric system for measuring ionizing x-ray or gamma-ray photons, the measuring system comprising:
- a radiation source, configured to emit ionizing radiation;
- a pixelated detector, which comprises pixels, each pixel being configured to detect radiation emitted by the radiation source, and to acquire thereof an energy spectrum, in a plurality of energy channels;

the spectral response of the measuring system comprising effective spectra, defined for each pixel, and in each energy channel;
the effective spectrum of a pixel, in each energy channel, corresponding to an energy distribution of the photons detected, by the pixel, in the energy channel, in the absence of any object interposed between the source and the pixel; the method comprising:

a) placing a calibration object between the radiation source and the detector, the calibration object comprising:
  a first material, having a first thickness, the first material being associated with a first theoretical linear-attenuation spectral function;
  a second material, having a second thickness, the second material being associated with a second theoretical linear-attenuation spectral function;

b) irradiating the calibration object with the radiation source and acquiring, with a pixel of the detector, a calibration spectrum of the radiation transmitted by the calibration object and reaching the pixel;

c) in various energy channels, taking into account an attenuation spectral function of the calibration object, this function comprising a first apparent linear-attenuation spectral function of the first material and a second apparent linear-attenuation spectral function of the second material multiplied by the first thickness and by the second thickness, respectively;

d) repeating steps a) to c), using various calibration objects, the various calibration objects having different first thicknesses and/or second thicknesses, respectively;

e) determining an effective spectrum of the pixel in at least an energy channel, via a minimization of differences between respectively:
  a value of the calibration spectrum measured in step b) of each iteration (k), in said energy channel;
  and an estimation of the value of each calibration spectrum, in said energy channel, each estimation being obtained by combining the effective spectrum of the pixel and the attenuation spectral function of the calibration object taken into account in step c) of each iteration;

wherein, in step c) of each iteration:
  the first apparent linear-attenuation spectral function is a weighted sum of the first theoretical linear-attenuation spectral function and of a first correction spectral function;
  and/or the second apparent linear-attenuation spectral function is a weighted sum of the second theoretical linear-attenuation spectral function and of a second correction spectral function.

The first apparent linear-attenuation spectral function may comprise:
  the first theoretical linear-attenuation spectral function weighted by a first scalar;
  the first correction spectral function weighted by a second scalar.

The first and the second scalar may be determined during the minimization performed in step e).

The second apparent linear-attenuation spectral function may comprise:
  the second theoretical linear-attenuation spectral function weighted by a third scalar
  the second correction spectral function weighted by a fourth scalar.

The third and the fourth scalar may be determined during the minimization performed in step e).

According to an embodiment, the first correction spectral function is the second theoretical linear-attenuation spectral function.

According to an embodiment, the second correction spectral function is the first theoretical linear-attenuation spectral function.

According to an embodiment, the first correction spectral function and/or the second correction spectral function is a theoretical linear-attenuation spectral function of a third material, different from the first material and from the second material.

Step e) may employ an iterative optimization algorithm

Step e) may comprise:
forming a vector, containing the various values of the calibration spectra resulting from step c) of each iteration;
estimating said vector, each term of the vector being estimated by combining the effective spectrum of the pixel and the attenuation spectral function of the calibration object taken into account in step c) of each iteration, respectively.

A second subject of the invention is a spectrometric system, for measuring ionizing X-ray or gamma-ray photons, the measuring system comprising:
a radiation source, configured to emit ionizing radiation;
a pixelated detector, which comprises pixels, each pixel being configured to detect radiation emitted by the radiation source, and to acquire thereof an energy spectrum, in a plurality of energy channels;
the measuring system further comprising a processing unit, configured to implement step e) of the method of claim 1, on the basis of various calibration spectra measured by at least one pixel, according to steps a) to c) of the method according to the first object of the invention.

The invention will be better understood on reading the description of the exemplary embodiments, which are described, in the rest of the description, with reference to the figures listed below.

DESCRIPTION OF PARTICULAR EMBODIMENTS

Figure 1:
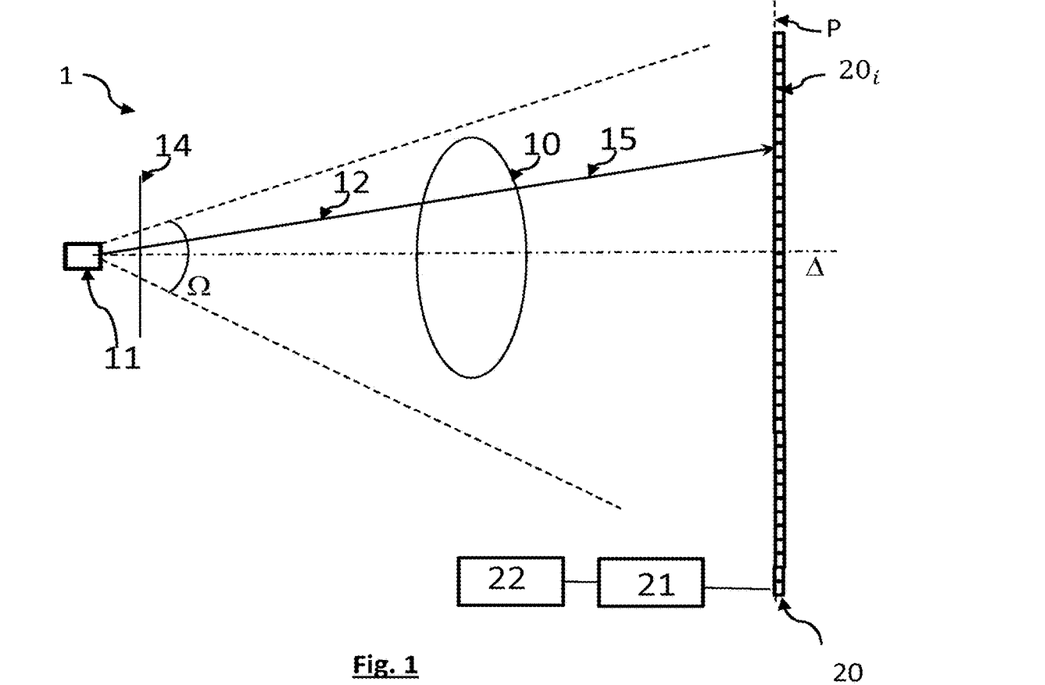
FIG. 1 schematically shows a device allowing the invention to be implemented.

FIG. 1 shows one embodiment of a measuring system 1 implementing a method according to the invention. The measuring system comprises a radiation source 11 and a detecting device 20.

The radiation source 11 emits ionizing electromagnetic radiation 12, which is referred to as incident radiation, toward an object 10. The object 10 is placed between the radiation source 11 and the detecting device 20. The radiation source 11 is generally an X-ray tube. The radiation source emits in a solid angle $\Omega$ extending about an axis A. The radiation source 11 may be associated with a filter 14, placed in the field of observation allowing the incident radiation to be attenuated, notably at low energy. It may for example be a question of an aluminum filter of a few millimeters thickness.

The detecting device 20 comprises radiation detectors $20_i$, taking the form of pixels $20_i$ arranged in a plane, called the detection plane P. The index i designates the coordinates of each pixel in the detection plane. The pixels may be arranged in a line but, in general, they are arranged in a regular two-dimensional matrix array.

The object 10 may be a living biological tissue, for example a body part of an animal or of a human being. The device is then a medical imaging device. The object may also be an industrial part or an item of baggage, the device then being used for the purposes of nondestructive testing or screening.

The term "ionizing electromagnetic radiation" designates electromagnetic radiation made up of photons of energy higher than 1 keV, and preferably lower than 5 MeV. The energy range of the ionizing radiation may be comprised between 1 keV and 2 MeV, but it most often lies between 1 keV and 150 keV or 300 keV. The ionizing radiation may be X-ray or γ-ray radiation. Preferably, the source of ionizing radiation is poly-energetic, the incident radiation being emitted in an energy range generally extending over several tens or even hundreds of keV.

The object 10 irradiated by the source 11 transmits, to the detecting device 20, radiation 15, which is referred to as transmitted radiation, the latter reaching the pixels, each of which forms one detector $20_i$. Each pixel $20_i$ is a spectrometric detector comprising:
a detector material that is able to interact with the photons of the radiation 15 transmitted by the object, this material being of scintillator type or, preferably, a semiconductor compatible with use at room temperature, such as CdTe or CdZnTe;
an electronic circuit that is able to generate a signal the amplitude of which depends on, and is preferably proportional to, the energy deposited by each photon that interacts in the detector material;
a spectrometry circuit that is able to establish an energy spectrum, denoted $M_i$, of the signals detected during a time period, called the acquisition period.

Each pixel $20_i$ is thus able to detect said transmitted radiation 15 and to form thereof an energy spectrum $M_i$.

The system 1 also comprises a processing unit 22. The processing unit 22 comprises a microprocessor that is connected to a programmable memory 21 in which is stored a sequence of instructions for performing the spectra-processing and computing operations described in this description. These instructions may be saved on a processor-readable storage medium such as a hard disk, CD-ROM or other type of memory.

An energy spectrum $M_i$ is a vector each term $M_i(c)$ of which represents an amount of radiation detected by the pixel $20_i$, during a duration of acquisition of the spectrum, in an energy band $$E \pm \frac{\partial E}{2},$$

with $\partial E$ being the spectral width of each channel. Each energy band is usually designated by the term "energy channel", which is known to those skilled in the art.

In the rest of the description, the term "spectral function" designates a function discretized into various energy channels.

Figure 2A:
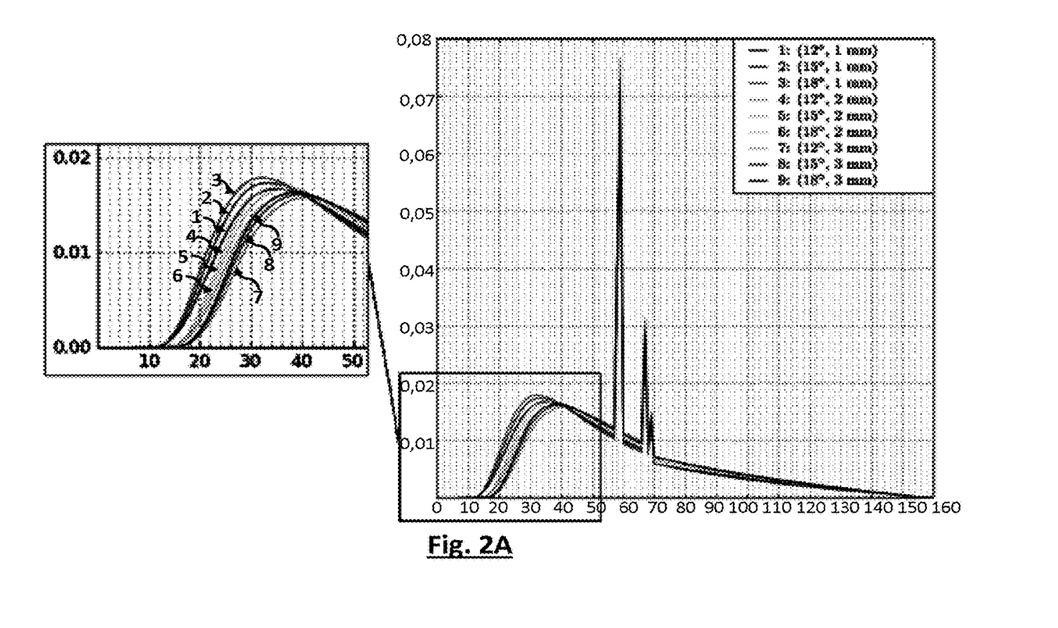
FIG. 2A illustrates a variability of a spectrum of radiation emitted by the source and to which is exposed a pixel.

FIG. 2A shows a theoretical model of an irradiation spectral function $F_i^0$ of a pixel $20_i$ irradiated by a radiation source consisting of an X-ray tube. It is a question of a spectrum of radiation emitted by the source 11 and to which is exposed a pixel 201. The irradiation spectral function $F_i^0$ comprises characteristic peaks, which correspond to peaks of fluorescence of the material forming the anode of the source, when the latter is an x-ray tube. To perform these simulations, the detector was considered to be exposed to the radiation source directly, i.e. with no object between the radiation source and the detector. The thickness (in mm) of the aluminum filter 14 and the anode angle (in °) were varied. The anode angle corresponds to an orientation of the anode with respect to a plane perpendicular to an electron beam striking the anode. In FIG. 2A nine configurations, referenced from 1 to 9, have been modeled. Depending on the parameters (thickness, angle), the irradiation spectral function $F_i^0$ varies, in particular at low energy. In FIG. 2A, the x- and y-axes represent the energy (keV) and normalized values of each energy channel, respectively. It may be seen that the form of the spectrum emitted by the radiation source varies depending on the parameterization of the latter. By value of an energy channel, what is meant is a value of the spectrum in said energy channel, i.e. the number of signals detected in the energy channel.

Figure 2B:
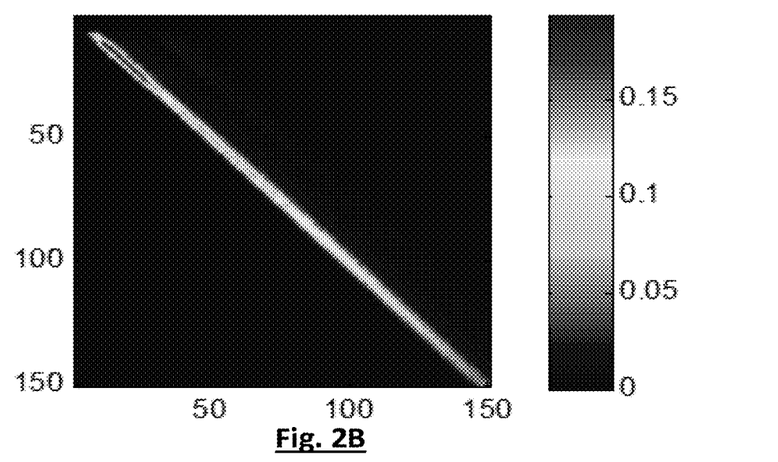
FIG. 2B shows a response matrix of a pixel.

Each pixel $20_i$ of the detector 20 may be characterized by a response matrix $D_i$. An example of a response matrix $D_i$, obtained by simulation, of size $N_c \times N_E$, is shown in FIG. 2B. $N_c$ is the number of channels of each spectrum formed by the detector and $N_E$ is the number of channels into which the energy of radiation incident on the pixel is discretized. $N_c$ and $N_E$ are two positive integers. In this example, $N_c = N_E = 150$.

Each term $D_i(c, E)$ of the response matrix represents a probability that a photon incident on the pixel, of energy E, is considered by the pixel to have an energy c.

Figure 2C:
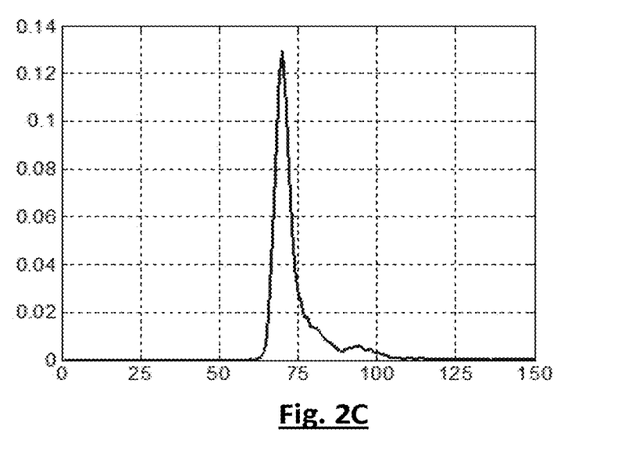
FIGS. 2C and 2D show a row and a column of the response matrix shown in FIG. 2B, respectively.
Figure 2D:
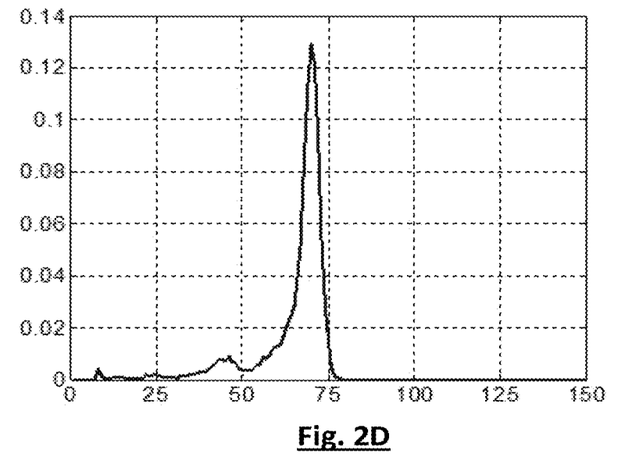
Figure 3A:
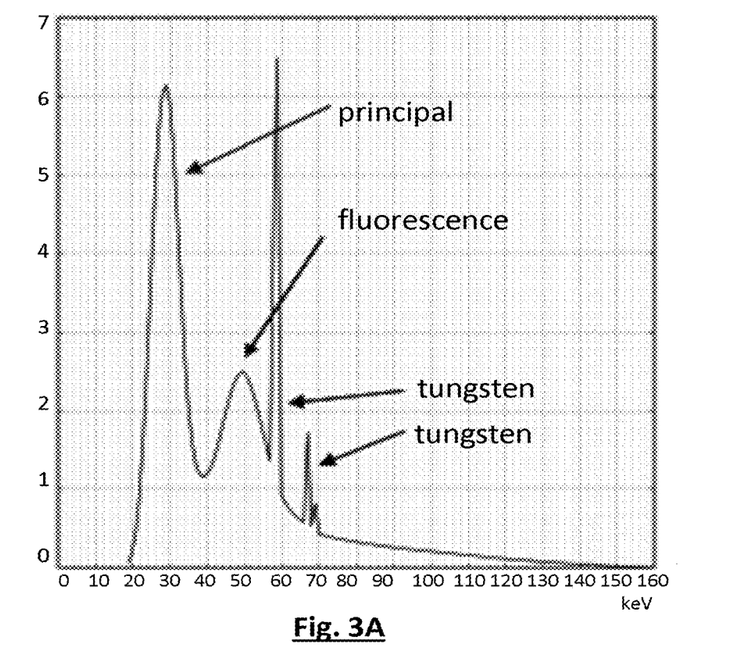
FIGS. 3A to 3D are examples of effective spectra associated with various energy channels of a pixel, respectively.
Figure 3B:
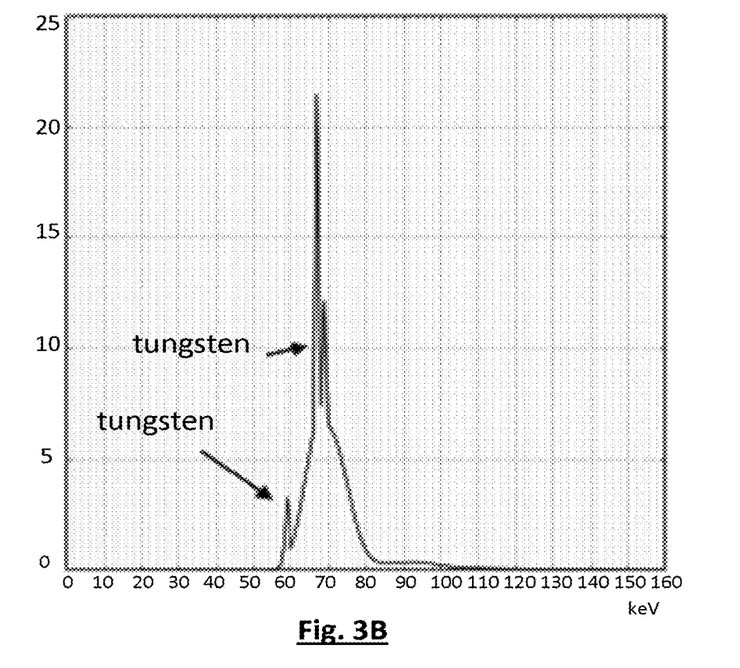
Figure 3C:
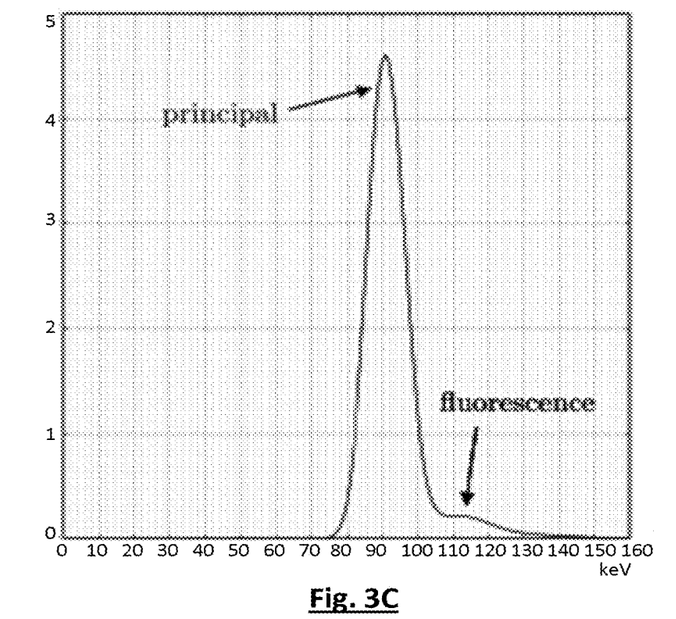
Figure 3D:
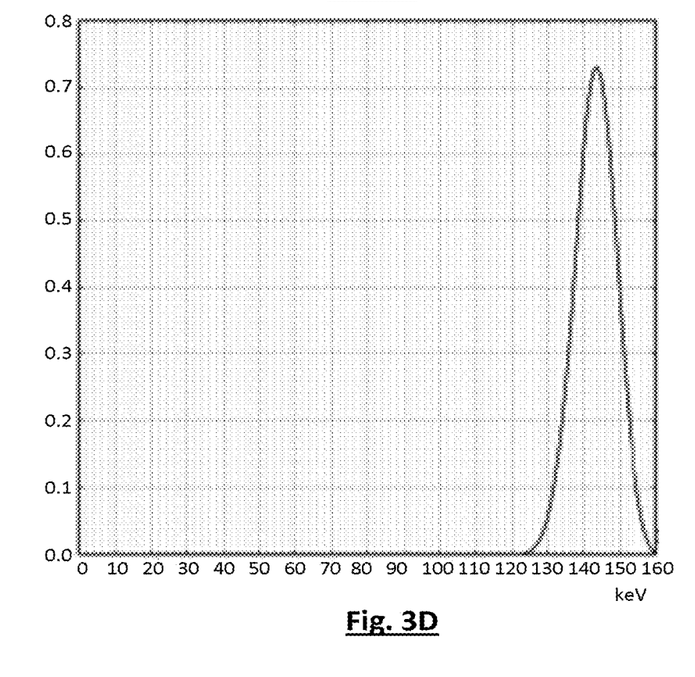

In other words, each row $D_i(c, \bullet)$ of the response matrix, such as the row shown in FIG. 2C, represents a probability distribution of the energy E of a photon reaching the pixel when a photon is detected in the channel c. FIG. 2C shows row 70 of the response matrix $D_i$. Analogously, each column $D_i(\bullet, E)$ of the response matrix, such as the column shown in FIG. 2D, corresponds to a probability distribution of the energy channel c in which the photon is detected by the pixel when the photon reaching the pixel has an energy E. FIG. 2D shows column 70 of the response matrix $D_i$. In the case of a perfect pixel, the response matrix $D_i$ is the identity matrix.

The response matrix $D_i$ is characteristic of each pixel $20_i$. The variability in the response matrix $D_i$ may be high between the pixels $20_i$ of a given detector 20.

For each pixel $20_i$, the irradiation spectral function $F_i^0$ and the response matrix $D_i$ form a response of the detecting device. This response must be taken into account when an object 10 is placed between the radiation source 11 and the pixel $20_i$, and when a spectrum $M_i$ transmitted by the object and detected by the pixel is analyzed. It is conventional to express the response of a pixel $20_i$ in the form of effective spectra $S_{i,c}^{\mathit{eff}}$, defined for each channel c, such that:

$$S_i^{\mathit{eff}}(c,E) = D_i(c,E) F_i^0(E) \tag{1}$$

Each term $S_i^{\mathit{eff}}(c, E)$ describes a contribution of incident photons of energy E to the number of photons detected in an energy channel C. Each term combines the response function of the radiation source 11, which function is represented by the irradiation spectral function $F_i^0$, and the response function of the pixel, which function is represented by the response matrix $D_i$.

The effective spectra $S_{i,c}^{\mathit{eff}}$ associated with a pixel $20_i$, for various channels c, respectively, may be expressed in the form of a matrix of effective spectra $S_i^{\mathit{eff}}$ of size $N_c \times N_E$. Each row of the matrix of the effective spectra $S_i^{\mathit{eff}}$ of a pixel $20_i$ is a row vector, of size $(1, N_E)$, corresponding to an effective spectrum $S_{i,c}^{\mathit{eff}}$ of a channel c for the pixel $20_i$. For a given channel c, the effective spectrum $S_{i,c}^{\mathit{eff}}$ corresponds to a distribution of the energy of the incident photons contributing to the number of events detected in the channel, in the absence of any object between the radiation source and the pixel. The matrix of the effective spectra $S_i^{\mathit{eff}}$ of a pixel $20_i$ is a matrix formed by assembling the $N_c$ effective channel spectra $S_{i,c}^{\mathit{eff}}$ of the pixel, said spectra taking the form of row vectors. The effective spectrum is not directly measurable. It is in contrast possible to estimate it or to simulate it.

In the FIGS. 3A, 3B, 3C and 3D, effective spectra $S_{i,c}^{\mathit{eff}}$ of various channels of a given pixel $20_i$ have been shown. It is a question of channels of respective ranks: 1, 5, 7 and 12. The effective spectra were obtained by simulation, considering a radiation source comprising an anode made of tungsten raised to the potential of 160 kV, the pixel forming a spectrum discretized into 12 channels of 11 keV spectral width. Conventionally, the rank of each channel c increases with energy. The channels 1, 5, 7 and 12 address the respective energy ranges [22 keV-32 keV], [66 keV-76 keV], [88 keV-98 keV] and [143 keV-153 keV]. For the channels of low ranks, the contributions of high energies are important. The higher the rank of the channel, the closer the effective spectrum of a channel gets to a column of the response matrix $D_i$ of the pixel $20_i$, taking into account Gaussian noise. In each of FIGS. 3A to 3D, the x-axis corresponds to energy, expressed in keV, and the y-axis corresponds to the value of each energy channel. In each of these figures, the main peak (principal) and fluorescence peaks (fluorescence) or peaks characteristic of tungsten (tungsten) have been identified.

When a pixel $20_i$ is directly exposed to the radiation source 11, i.e. without any object 10 interposed between the pixel and the detector, it acquires a direct radiation spectrum, or full-flux spectrum, $M^0$, each value $M^0(c)$ of each channel c of which is such that:

$$M^0(c) = \sum_1^{N_E} D_i(c, E) F_i^0(E) = \sum_1^{N_E} S_i^{\mathit{eff}}(c, E) \tag{2}$$

When a pixel $20_i$ is exposed to the radiation source, with an object 10, having a spectral attenuation function att, interposed between the pixel and the detector, it acquires a measurement spectrum M, each value M(c) of each channel c of which is such that:

$$M(c) = \sum_1^{N_E} D_i(c, E)F_i^0(E)e^{-att(E)} = \sum_1^{N_E} S_i^{eff}(c, E)e^{-att(E)} \quad (3)$$

Spectral attenuation att is a function known to those skilled in the art. If I and $I_0$ represent an intensity of radiation produced by a given radiation source 10 reaching a given pixel in the presence and in the absence of an object, respectively, the spectral attenuation of the object att is such that:

$$\frac{I(E)}{I_0(E)} = e^{-att(E)} \quad (4)$$

Expression (3) shows that knowledge of the effective spectra of a pixel $20_i$ (i.e. of the effective spectra of each channel c of a pixel $20_i$) allows a linear relationship with the exponential of the spectral attenuation att to be obtained.

The spectral attenuation of a material depends on the thickness L of the material passed through by the radiation, according to the expression:

$$att(E) = -\mu(E)L \quad (5)$$

$\mu(E)$ corresponds to the linear-attenuation spectral function. The linear-attenuation spectral function of a high number of materials is known, and easily accessible, for example from databases. In this case, the linear-attenuation spectral function is said to be theoretical.

The determination of the effective spectrum of a pixel is not direct. Specifically, when a full-flux measurement is performed, a spectrum $M^0$ each channel c of which has a value $M^0$(c) determined by expression (2) is measured by each pixel $20_i$.

A first way of determining an effective spectrum is to carry out modeling, but this may be subject to uncertainties. Therefore, an experimental estimation is preferable.

According to one known experimental approach, it is possible to place various calibration objects $10_k$, the attenuation of which is known, between the radiation source and a pixel $20_i$ to be characterized. For example, the calibration object $10_k$ is formed from a first thickness $L_1$ of a first material, of theoretical linear spectral attenuation $\mu_1(E)$, and from a second thickness $L_2$ of a second material, of theoretical linear spectral attenuation $\mu_2(E)$. The attenuation spectral function of each calibration object $10_k$ is then:

$$att_k(E) = \mu_k(E)L_k = \mu_1(E)L_{1,k} + \mu_2(E)L_{2,k} \quad (6)$$

$L_{1,k}$ and $L_{2,k}$ are the thickness of the first material and the thickness of the second material in the calibration object $10_k$, respectively. $L_k$ is the thickness of the calibration object. $\mu_k$ is a linear-attenuation spectral function of the calibration object. Each thickness extends along a straight line joining the radiation source to the pixel $20_i$ in question.

Figure 4:
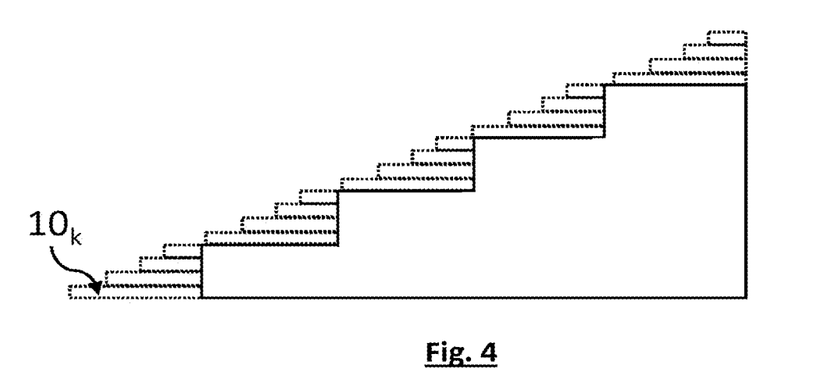
FIG. 4 schematically shows a calibration object.

It is conventional to use a composite tiered object such as schematically shown in FIG. 4, comprising a plurality of layers $10_k$, each layer forming one calibration object formed from a first thickness $L_{1,k}$ of a first material and from a second thickness $L_{2,k}$ of a second material. For example, the first material is aluminum and the second material is a plastic such as polymethyl methacrylate (PMMA). Such a composite object is for example described in Schmidt T. G et al "Spectral CT metal artifact resolution with an optimization-based reconstruction algorithm", SPIE Medical Imaging Proceedings Volume 10132, 2017.

By successively placing each layer $10_k$ facing one pixel, a series of calibration spectra $M_k$ are acquired the value $M_k(c)$ of each channel c of which is such that:

$$M_k(c) = \sum_1^{N_E} S_i^{eff}(c, E)e^{-att_k(E)} = \sum_1^{N_E} S_i^{eff}(c, E)e^{-(\mu_1(E)L_{1,k} + \mu_2(E)L_{2,k})} \quad (7)$$

If $N_k$ corresponds to the number of calibration objects $10_k$, for example corresponding to the number of layers of the composite object shown in FIG. 4, it is possible to form, for each channel c, a vector $M_{k,c}$ comprising the $N_k$ values $M_k(c)$. The vector $M_{k,c}$ is of ($N_k$, 1) size.

According to (7), it is possible to write:

$$M_{k,c} = ATT \times S_{i,c}^{eff} \quad (8)$$

where:
- $S_{i,c}^{eff}$ is the effective spectrum of a channel c of the pixel $20_i$, which takes the form of a column vector of ($N_E$, 1) size;
- ATT is an attenuation matrix, of ($N_k$, $N_E$) size. Each row of the matrix ATT corresponds to the attenuation $att_k(E)$ discretized in energy.

Each value $M_k(c)$, described with reference to expression (7), is an experimentally measured value. Taking into account an estimation $\hat{S}_{i,c}^{eff}$ of an effective spectrum, for the channel c, the vector $M_{k,c}$ may be estimated such that:

$$\hat{M}_{k,c} = ATT \times \hat{S}_{i,c}^{eff} \quad (9)$$

where $\hat{M}_{k,c}$ is an estimation of the vector $M_{k,c}$ taking into account the estimation of the effective spectrum $\hat{S}_{i,c}^{eff}$.

By taking a sufficiently high number $N_k$ of measured spectra $M_k$, the effective spectrum of the pixel $20_i$, for the channel c, may be obtained using an optimization algorithm, such that:

$$S_{i,c}^{eff} = \max_{\hat{S}_{i,c}^{eff},k} P(\hat{M}_{k,c} | M_{k,c}) \quad (10)$$

where $P(\hat{M}_{k,c}|M_{k,c})$ is a probability of obtaining the vector $\hat{M}_{k,c}$ given the vector $M_{k,c}$.

Equation (10) may be solved using an iterative algorithm of maximum-likelihood type, for example one that estimates a Poissonian maximum likelihood or a Gaussian maximum likelihood.

However, the inventors have observed that such an approach is based on the fact that each calibration material forming the calibration object has a linear-attenuation spectral function corresponding to the theoretical function known for this material, such as available in conventional databases.

The inventors have observed that a discrepancy between the actual linear-attenuation spectral function of a material and the theoretical linear-attenuation spectral function may engender a significant error in the estimation of the effective spectrum of each channel of a pixel.

Figure 5A:
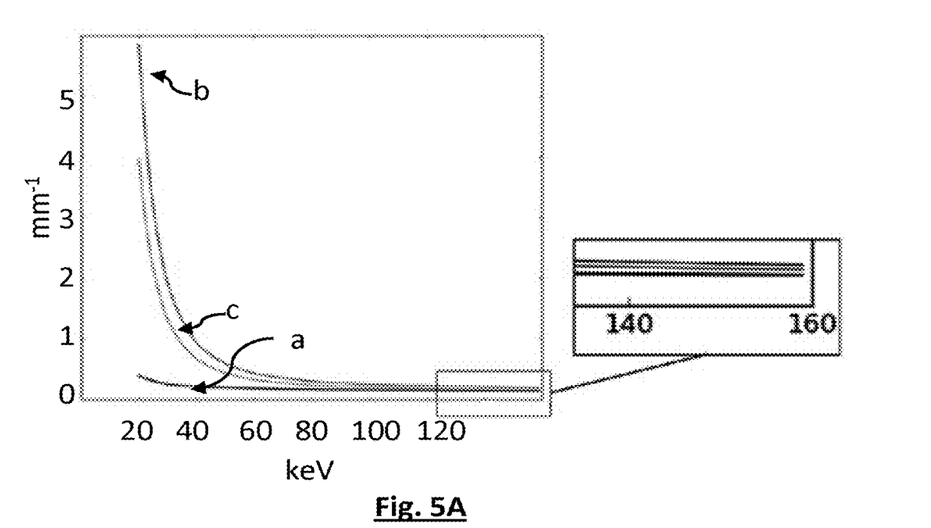
FIG. 5A shows theoretical linear-attenuation spectral functions of polypropylene (PP) and polyvinyl chloride (PVC) and a modified-attenuation spectral function of PVC.

To do this, they simulated an estimation of an effective spectrum, for two channels of a given pixel, using:

- on the one hand, theoretical linear-attenuation spectral functions available for two constituent materials of the calibration object, these materials being polypropylene (PP) and polyvinyl chloride (PVC). The theoretical attenuation spectral functions of these two materials have been shown in FIG. 5A (curve a for PP and curve b for PVC).
- on the other hand, the theoretical linear-attenuation spectral function of polypropylene and a modified theoretical spectral function of PVC. The modified theoretical spectral function of PVC is shown by curve c of FIG. 5A.

Figure 5B:
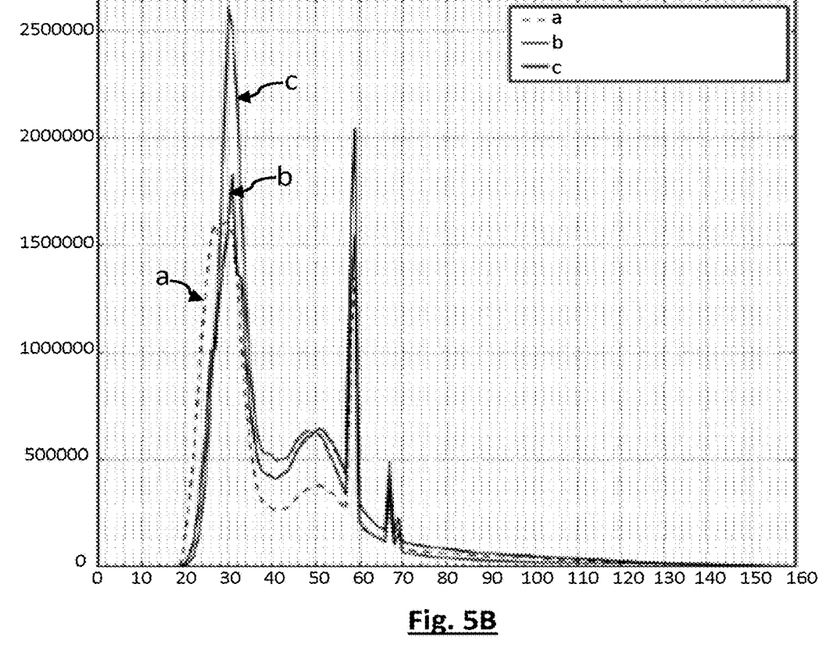
FIGS. 5B and 5C show the effective spectra associated with two energy channels of a pixel, respectively, considering the attenuation spectral functions of PP and PVC on the one hand and the modified-attenuation spectral functions of PP and PVC on the other hand.
Figure 5C:
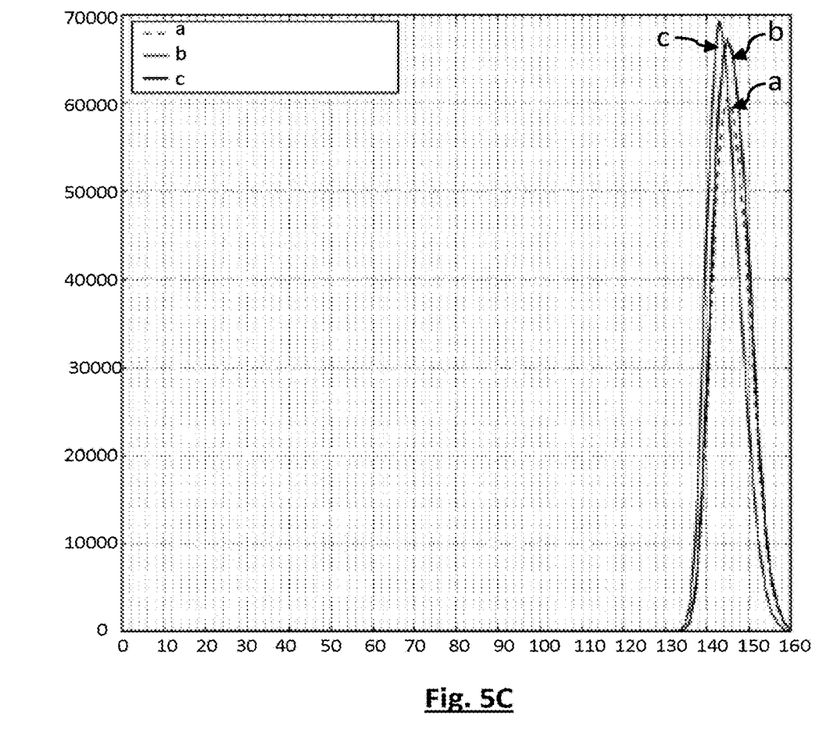

Irradiation of a composite object, such as shown in FIG. 4, with a radiation source such as described above (tungsten anode, 160 kV potential) has been simulated, each simulated spectrum comprising 12 channels of 11 keV spectral width. FIG. 5B corresponds to channel 1 (spectral band [22 keV-32 keV]). FIG. 5C corresponds to channel 12 (spectral band [143 keV-153 keV]).

FIGS. 5B and 5C show:
- the true effective spectrum of the channel, the latter being known since it is a question of a simulation: curve a, dashed line;
- the effective spectrum obtained, employing an iterative optimization algorithm such as described with reference to expression (10), on the basis of measurements modeled, taking into account the theoretical attenuation function of PP and the modified attenuation function of PVC: an initial spectrum, corresponding to the effective spectrum estimated following a first iteration (curve b), and the effective spectrum obtained following convergence of the algorithm (curve c) have been shown. The error is particularly large at low energy.

The results presented in FIGS. 5B and 5C show that taking into account an attenuation spectral function that is slightly different from that corresponding to the material used in the calibration object induces a significant error, the algorithm converging, in each channel, to an estimation that is significantly different from the actual effective spectrum.

When the spectra measured by a pixel are intended for a tomographic reconstruction, an error in the estimation of the effective spectrum is propagated and may engender a reconstruction error.

The calibration materials, forming a calibration object, may be subject to random variation in their manufacturing process or in their composition. An uncertainty in the validity of the theoretical linear-attenuation spectral function that is assigned thereto results therefrom. As explained with reference to FIGS. 5A to 5C, the uncertainty in the linear-attenuation spectral function taken into account may induce a significant error in the estimation of the effective spectrum.

Figure 6:
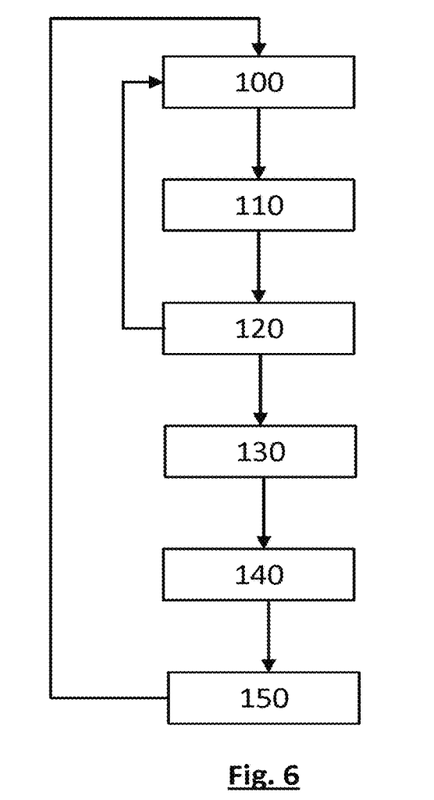
FIG. 6 schematically shows the main steps of the invention.

In order to solve this problem, the inventors have provided a method, the main steps of which are schematically shown in FIG. 6, and described below.

Step 100: placing a calibration object $10_k$ between a radiation source and a detector 20 comprising spectrometric pixels, such as described above. The calibration object comprises a first thickness $L_{1,k}$ of a first material, of theoretical linear spectral attenuation and from a second thickness $L_{2,k}$ of a second material, of theoretical linear spectral attenuation $\mu_2$. The linear spectral attenuations $\mu_1$ and $\mu_2$ are theoretical spectral attenuations, which are for example available in accessible databases.

Step 110: irradiating the calibration object and acquiring calibration spectra $M_k$. Step 120: reiterating steps 100 to 110 while modifying the calibration object, such that the first thickness $L_{1,k}$ and/or the second thickness $L_{2,k}$ are modified.

Step 130: taking into account a variability in the first attenuation spectral function of the first material, and/or in the second attenuation spectral function of the second material.

In order to take into account a potential discrepancy between the actual linear-attenuation spectral function of the first material (and/or of the second material), a linear-attenuation spectral function that is referred to as the apparent linear-attenuation spectral function, of the first or of the second material, is taken into account. The apparent linear-attenuation spectral function is considered to be representative of the material in question.

When it is a question of the first material, the first apparent linear-attenuation spectral function is such that:

$$\mu'_1 = a_1\mu_1 + a_2\mu_2 \quad (11)$$

where:
- $\mu_1$ and $\mu_2$ are the theoretical linear-attenuation spectral functions of the first material and of the second material, respectively;
- $a_1$ and $a_2$ are real parameters.

When it is a question of the second material, the second apparent linear-attenuation spectral function is such that:

$$\mu'_2 = b_1\mu_1 + b_2\mu_2 \quad (12)$$

where:
- $\mu_1$ and $\mu_2$ are the theoretical linear-attenuation spectral functions of the first material and of the second material, respectively;
- $b_1$ and $b_2$ are real parameters.

Thus, for each calibration object, on the basis of equation (6), when a variability in the attenuation function is taken into account for the first material and the second material, the spectral attenuation is such that:

$$att_k = \mu'_1 L_{1,k} + \mu'_2 L_{2,k} = (a_1\mu_1 + a_2\mu_2)L_{1,k} + (b_1\mu_1 + b_2\mu_2)L_{2,k} \quad (13)$$

The parameters $a_1$, $a_2$, $b_1$ and $b_2$ are unknowns, which are estimated in step 140.

This step amounts to considering the spectral attenuation of a calibration material to not exactly correspond to the theoretical data available for this material. The variability is taken into account by:
- weighting the theoretical spectral attenuation for the material in question, by the real numbers $a_1$ (for the first calibration material) and $b_2$ (for the second calibration material);
- adding a contribution of a correction spectral function. In the described example, the correction spectral function is a theoretical linear-attenuation spectral function of another material, for example:
  - for the first calibration material, the theoretical linear-attenuation spectral function $\mu_2$ of the second calibration material, the latter function being weighted by the real number $a_2$;
  - for the second calibration material, the theoretical linear-attenuation spectral function $\mu_1$ of the first calibration material, the latter function being weighted by the real number $b_1$.

Taking into account the variability in the attenuation spectral functions of the calibration materials takes into account the fact that a linear-attenuation function of a material may be expressed by a combination of linear-attenuation functions of at least two other materials, as described in the publication Alvarez R. E. "Energy-selective reconstructions in x-ray computerised tomography", Phys. Med. Biol 21, pp. 733, 1976.

Step 140: Estimating the unknowns

In this step, the effective spectrum $S_{i,c}^{eff}$ defined for each channel c for a given pixel $20_i$, and the parameters $a_1$, $a_2$, $b_1$ and $b_2$, are estimated, such that:

$$S_{i,c}^{eff}, a_1, a_2, b_1, b_2 = \max_{S_{i,c}^{eff}, a_1, a_2, b_1, b_2} P(\hat{M}_{k,c} | M_{k,c}) \quad (14)$$

The effective spectrum of each channel, and the parameters $a_1$, $a_2$, $b_1$, $b_2$, are estimated by implementing an iterative optimization method, such as described in association with expression (10). It may, for example, be a question of an MLEM method. The space of the parameters $a_1$, $a_2$, $b_1$, $b_2$ may be discretized.

Step 140 is implemented for each channel c of the energy spectrum acquired by the pixel. As many effective spectra $S_{i,c}^{eff}$ as there are channels are then obtained, the latter being able to be grouped together in a matrix of effective spectra $S_i^{eff}$ of the pixel, each row of which is formed by the effective spectrum $S_{i,c}^{eff}$ of one channel.

Generally, $a_1 > a_2$ and $b_2 > b_1$. Specifically, the apparent functions $\mu'_1$ and $\mu'_2$ are assumed to be relatively close to the theoretical functions $\mu_1$ and $\mu_2$. The method may comprise a constraint as to the interval in which each parameter lies. For example, $a_1$ and $b_2$ may be considered in an interval centered on 1, for example 1±0.3 or 1±0.2, whereas $a_2$ and $b_1$ may be considered in an interval centered on 0, for example 0±0.3 or 0±0.2. Such a constraint facilitates convergence of the algorithm.

The optimization algorithm may be iterative, in which case the values $a_1$, $b_1$, $a_2$, $b_2$ may be initialized. The initialization may be random. Preferably, the initialization is such that $a_1=1$, $b_1=0$, $a_2=0$, $b_2=1$.

Step 150: reiterating steps 100 to 140, for another pixel of the detector. The effective spectra determined for each pixel are independent from one pixel to the next.

According to one variant, the correction spectral function taken into account for the first calibration material and/or the second calibration material may be a theoretical linear-attenuation spectral function of a third material $\mu_3$, different from the first material or from the second material.

The steps such as described above were simulated, considering a first calibration material corresponding to PP and the second calibration material corresponding to PVC. The first calibration material was assumed to be poorly known. In the simulation, the apparent linear-attenuation spectral function taken into account was such that: $\mu'_1 = a_1\mu_1 + a_2\mu_2$ with $a_1=0.92$ and $a_2=0.14$.

The second calibration material was assumed to be well known: in the simulation, the apparent linear-attenuation spectral function was considered to be equal to theory: $\mu'_2 = \mu_2$.

In the simulation, $a_1$, $a_2$, $b_1$, $b_2$ such that:

$\mu'_1 = a_1\mu_1 + a_2\mu_2$ and $\mu'_2 = b_1\mu_1 + b_2\mu_2$ were estimated.

Figure 7A:
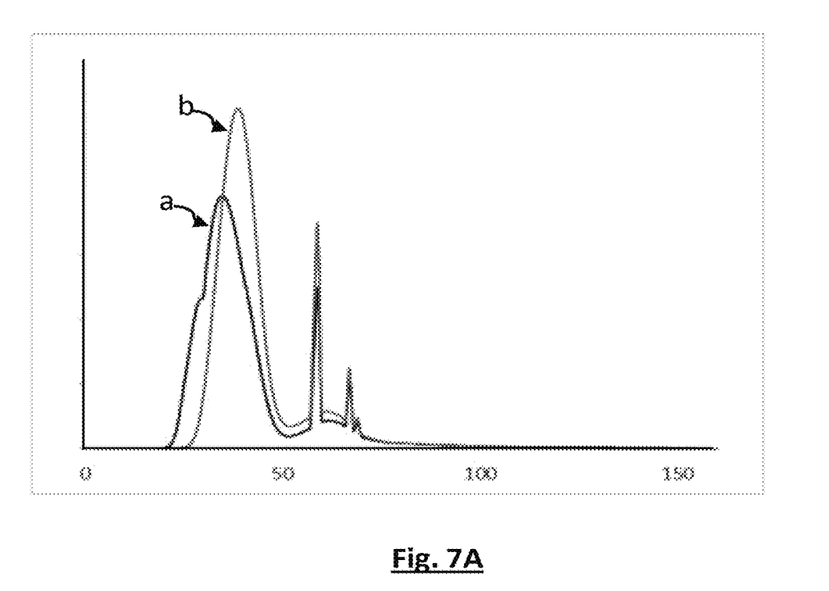
FIGS. 7A and 7B show an estimation of effective spectra associated with two energy channels of a pixel, respectively, with implementation of the invention and without implementation of the invention.
Figure 7B:
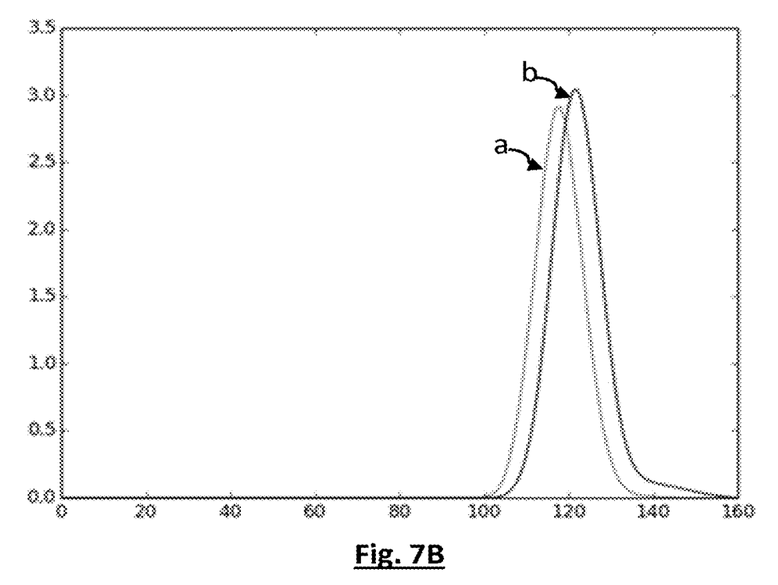

$a_1$ and $a_2$ were estimated. The estimation gave: $a_1=0.92$; $a_2=0.14$;

FIGS. 7A and 7B show, for channels 2 ([33 keV-43 keV]) and 10 ([121 keV-131 keV]), respectively:

the effective spectrum estimated without taking into account the variability in the attenuation spectral function of the calibration materials: curve a;

the effective spectrum estimated taking into account the variability in the attenuation spectral function of the calibration materials: curve b. It will be noted that the latter is superposed on the actual effective spectrum, the latter being known because simulated.

Thus, the invention allows a better estimation of the effective spectra respectively associated with the energy channels of a pixel.

The invention was the subject of an experimental trial, using five strips of 128 aligned CdTe pixels with a pitch of 800 μm, i.e. a total number of pixels equal to 640. The calibration materials were PP and PVC. During the calibration, 22 different thicknesses of PP and 22 different thicknesses of PVC were combined. An X-ray tube with a tungsten anode raised to 160 kV was used. The spectra acquired by the various pixels were grouped together so as to form 12 channels of 11 keV, as described above.

The method was applied considering:

$a_1$, $b_2 \in [0.85:1.15]$ with a discretization pitch of 0.025;

$a_2$, $b_1 \in [-0.15:1.15]$ with a discretization pitch of 0.025.

Since it was a question of experimental measurements, the effective spectra defined for each pixel were not known. One way of quantifying the performance of the method is to estimate a squared error E(c) in the measurements, which error is defined for each channel c, which can be expressed using the expression:

$$E(c) = \frac{1}{M^0(c) N_i N_k} \sum_{N_i} \sum_{N_k} \left( M_k(c) - \sum_1^{N_E} S_i^{eff}(c, E) e^{-att_k(E)} \right)^2 \quad (15)$$

where:

$N_i$ corresponds to the number of pixels;

$N_k$ corresponds to the number of calibration objects;

$M^0(c)$ corresponds to a full-flux measurement, in the channel c, as defined in association with expression (2);

$M_k(c)$ corresponds to the value, in the channel c, of a calibration spectrum $M_k$, cf. (7);

$\sum_1^{N_E} S_i^{eff}(c, E) e^{-att_k(E)}$ corresponds to an estimation of $M_k(c)$ given the matrix of the effective spectra $S_i^{eff}$.

The effective spectra were also estimated according to the prior art, without taking into account the variability in the linear-attenuation spectral functions of the calibration materials.

Figure 8:
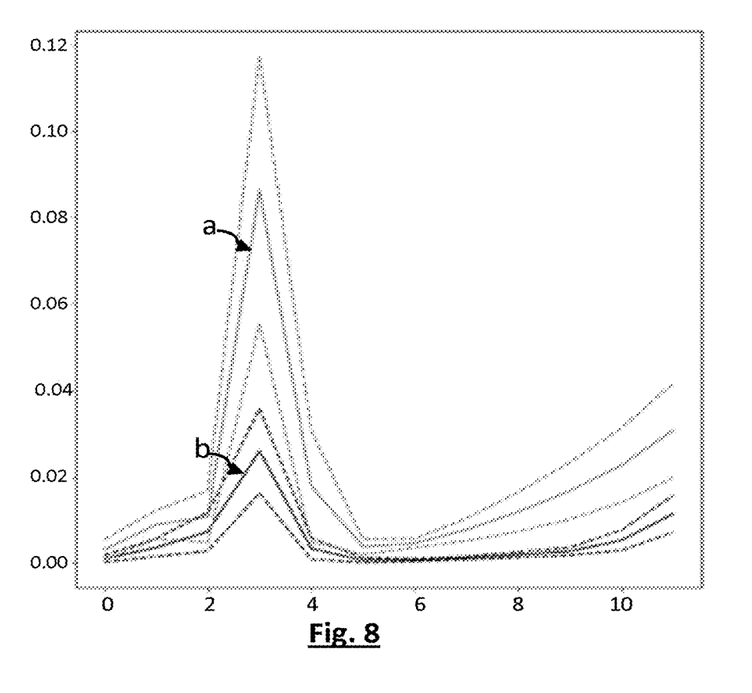
FIG. 8 shows a squared error, as a function of the energy channels of a pixel, with and without implementation of the invention.

FIG. 8 shows, for each channel, the squared errors respectively obtained by implementing the prior-art method (curve a) and the method according to the invention (curve b), respectively. In FIG. 8, the dashed values represent the confidence interval ±2σ. FIG. 8 attests to the relevance of the method devised by the inventors.

A tomographic reconstruction was performed using a phantom comprising two cylinders of plexiglass of 100 mm diameter and one cylinder of polyoxymethylene (POM) of 20 mm diameter. Inserts made of plastic were distributed in each cylinder. The cylinders lay parallel to the same axis.

The tomographic measurements were performed with the system 1 described in association with the preceding experimental trial. The duration of each acquisition was 1 second. 360 images were captured about the axis along which the cylinders extended, with an angular rotation of 1° between each acquisition.

The method such as described above was implemented, taking into account a variability only in the first calibration material, and more precisely setting $a_1=1$ and estimating the value of $b_2$.

The phantom was meshed to define voxels. The tomographic reconstruction allowed the attenuation, in each voxel, to be decomposed into an equivalent thickness of PP and an equivalent thickness of PVC.

A tomographic reconstruction was also performed considering an effective spectrum determined according to the prior art, without variability in the spectral attenuation functions of the calibration materials.

Figure 9A:
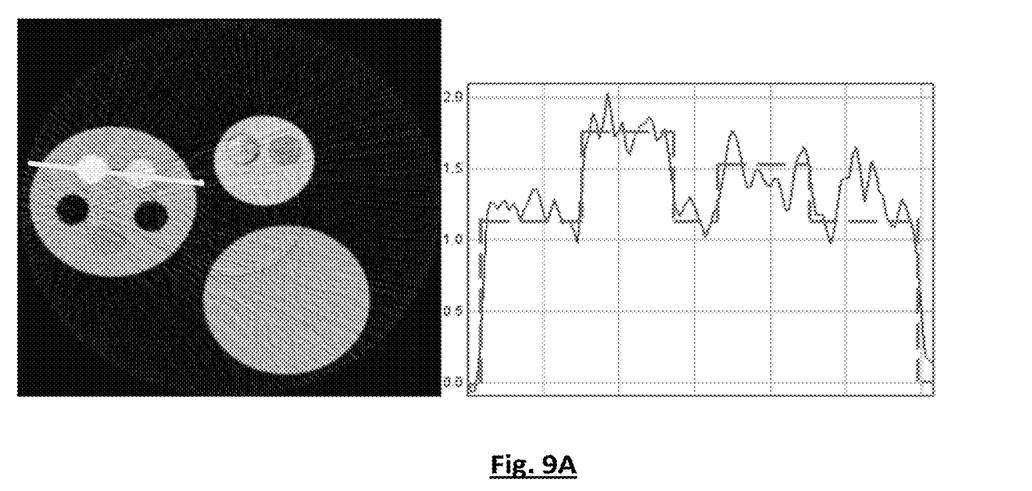
FIGS. 9A and 9B show results of tomographic reconstructions performed without implementation of the invention and with implementation of the invention, respectively.
Figure 9B:
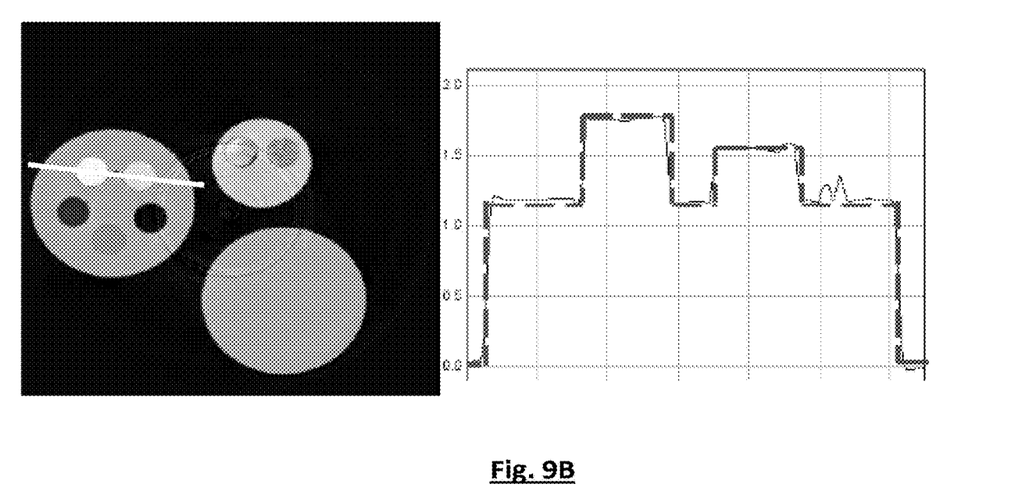

FIGS. 9A and 9B show, for a method according to the prior art and according to the invention, respectively:
- a cross-sectional view of the equivalent thickness of PP of each voxel (left-hand portion of the figure);
- a profile drawn on a light line shown in the left-hand portion.

On each profile, the reference values actually corresponding to the phantom have been drawn with a dashed line.

The method according to the prior art (FIG. 9A) is described in Potop A. et al "Investigation of the polynomial approach for material decomposition in spectral x-ray tomography using an energy-resolved detector", In Medical Imaging 2018: Physics of Medical Imaging, International Society for Optics and Photonics, 2018.

The results obtained by the invention (cf. FIG. 9B) are more stable and closer to the reference values, this confirming the relevance of the invention.

The invention will possibly be used in applications such as radiography and tomography, in the field of medical diagnostics, or in the inspection of nuclear materials or waste, in baggage screening or, more broadly, in security-related applications, or in nondestructive testing in an industrial context.

The invention claimed is:

1. A method for determining a spectral response of a spectrometric system for measuring ionizing x-ray or gamma-ray photons, the measuring system comprising:
    a radiation source, configured to emit ionizing radiation;
    a pixelated detector, which comprises pixels, each pixel being configured to detect radiation emitted by the radiation source, and to acquire thereof an energy spectrum, in a plurality of energy channels;
the spectral response of the measuring system comprising effective spectra, defined for each pixel, and in each energy channel;
the effective spectrum of a pixel, in each energy channel, corresponding to an energy distribution of the photons detected, by the pixel, in the energy channel, in the absence of any object interposed between the source and the pixel;
the method comprising:
a) placing a calibration object between the radiation source and the detector, the calibration object comprising:
    a first material, having a first thickness, the first material being associated with a first theoretical linear-attenuation spectral function;
    a second material, having a second thickness, the second material being associated with a second theoretical linear-attenuation spectral function;
b) irradiating the calibration object with the radiation source and acquiring, with a pixel of the detector, a calibration spectrum of the radiation transmitted by the calibration object and reaching the pixel;
c) in various energy channels, taking into account an attenuation spectral function of the calibration object, this function comprising a first apparent linear-attenuation spectral function of the first material and a second apparent linear-attenuation spectral function of the second material multiplied by the first thickness and by the second thickness, respectively;

d) repeating a) to c), using various calibration objects, the various calibration objects having different first thicknesses and/or second thicknesses, respectively;
e) determining an effective spectrum of the pixel in at least an energy channel, via a minimization of differences between respectively:
    a value of the calibration spectrum measured in step b) of each iteration, in said energy channel;
    and an estimation of the value of each calibration spectrum, in said energy channel, each estimation being obtained by combining the effective spectrum of the pixel and the attenuation spectral function of the calibration object taken into account in step c) of each iteration;
wherein, in step c) of each iteration:
    the first apparent linear-attenuation spectral function is a weighted sum of the first theoretical linear-attenuation spectral function and of a first correction spectral function;
    and/or the second apparent linear-attenuation spectral function is a weighted sum of the second theoretical linear-attenuation spectral function and of a second correction spectral function.

2. The method of claim 1, wherein the first apparent linear-attenuation spectral function comprises:
    the first theoretical linear-attenuation spectral function weighted by a first scalar;
    the first correction spectral function weighted by a second scalar;
    and wherein first and the second scalar are determined during the minimization performed in e).

3. The method of claim 1, wherein the second apparent linear-attenuation spectral function comprises:
    the second theoretical linear-attenuation spectral function weighted by a third scalar;
    the second correction spectral function weighted by a fourth scalar;
    and wherein the third and the fourth scalar are determined during the minimization performed in e).

4. The method of claim 1, wherein the first correction spectral function is the second theoretical linear-attenuation spectral function.

5. The method of claim 1, wherein the second correction spectral function is the first theoretical linear-attenuation spectral function.

6. The method of claim 1, wherein the first correction spectral function and/or the second correction spectral function is a theoretical linear-attenuation spectral function of a third material, different from the first material and from the second material.

7. The method of claim 1, wherein step e) employs an iterative optimization algorithm.

8. The method of claim 1, wherein step e) comprises:
    forming a vector, containing the various values of the calibration spectra resulting from step c) of each iteration;
    estimating said vector, each term of the vector being estimated by combining the effective spectrum of the pixel and the attenuation spectral function of the calibration object taken into account in step c) of each iteration, respectively.

9. The method of claim 1, wherein steps a) to e) are performed for each pixel of the detector.

10. A spectrometric system, for measuring ionizing X-ray or gamma-ray photons, the measuring system comprising:
    a radiation source, configured to emit ionizing radiation;

a pixelated detector, which comprises pixels, each pixel being configured to detect radiation emitted by the radiation source, and to acquire thereof an energy spectrum, in a plurality of energy channels;

the measuring system further comprising a processing unit, configured to implement step e) of the method of claim 1, on the basis of various calibration spectra measured by at least one pixel, according to steps a) to c) of the method of claim 1.

\* \* \* \* \*